(12) United States Patent
Parthasarathi

(10) Patent No.: US 6,292,459 B1
(45) Date of Patent: Sep. 18, 2001

(54) REDUCTION OF ELECTROSTATIC CHARGE BUILD-UP IN STORAGE MEDIUM

(75) Inventor: Sanjai Parthasarathi, San Jose, CA (US)

(73) Assignee: Terastor Corporation, Milpitas, CA (US)

( * ) Notice: Subject to any disclaimer, the term of this patent is extended or adjusted under 35 U.S.C. 154(b) by 0 days.

(21) Appl. No.: 09/311,933

(22) Filed: May 14, 1999

(51) Int. Cl.[7] ........................................ G11B 3/70
(52) U.S. Cl. ............................ 369/282; 369/289; 369/291
(58) Field of Search .................................... 369/280, 282, 369/286, 289–291

(56) References Cited

U.S. PATENT DOCUMENTS

| | | | | |
|---|---|---|---|---|
| 4,836,890 | * | 6/1989 | Murata et al. | 369/286 |
| 4,871,404 | * | 10/1989 | Murata et al. | 369/286 |
| 5,226,033 | * | 7/1993 | Takahashi | 369/290 |
| 5,289,456 | * | 2/1994 | Takahashi | 369/291 |
| 5,369,632 | * | 11/1994 | Takahashi | 369/282 |
| 5,453,884 | * | 9/1995 | Takahashi | 369/130 R |

* cited by examiner

Primary Examiner—Aristotelis M. Psitos
(74) Attorney, Agent, or Firm—Fish & Richardson P.C.

(57) ABSTRACT

A storage medium having a conducting path to dissipate electrostatic charge.

10 Claims, 4 Drawing Sheets

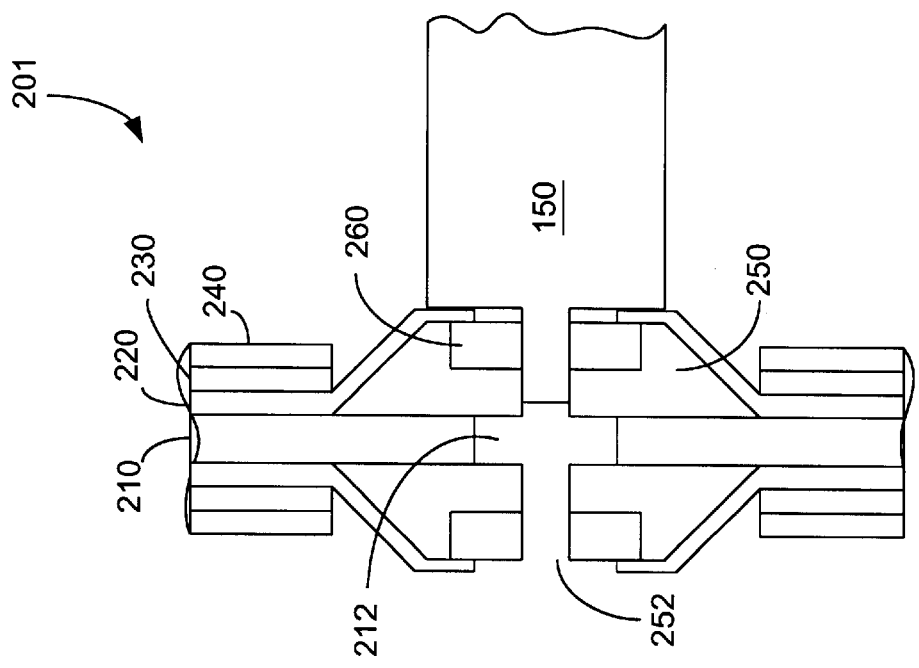
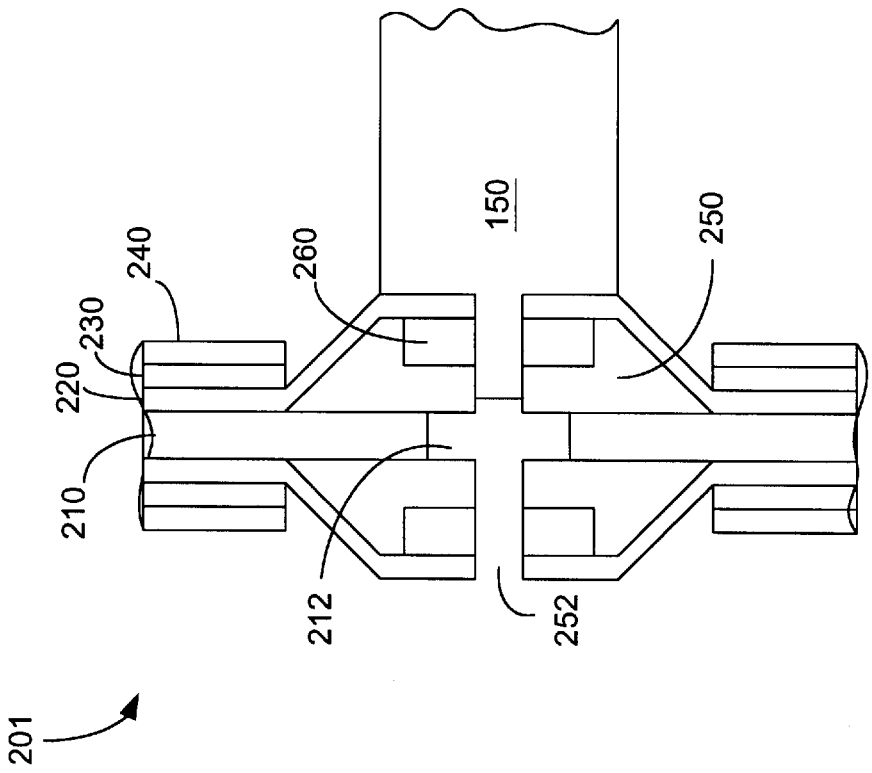

REDUCTION OF ELECTROSTATIC CHARGE BUILD-UP IN STORAGE MEDIUM

FIELD OF THE INVENTION

The present invention generally relates to data storage, and more particularly, to structures of storage media and systems.

BACKGROUND

A disk in a disk drive for data storage may build up electrostatic charge on its surfaces. Such electrostatic charge can be generated by several mechanisms including rubbing with surrounding components in the disk drive (e.g., the disk cartridge or shuttle), human or robotic handling of the disk cartridge that causes transfer and accumulation of electrostatic charge to the disk, and tribological charging of the disk by contacting the read-write head.

In many optical disk drives, a disk embossed with grooves and pits for tracking and servo and a cartridge for holding the disk are usually made of non-conductive materials. For example, these materials such as plastic, dielectric materials, or other non-conductive materials can be prone to build-up of static charge and may be charged up to a high static voltage. In a near-field optical disk drive, where the optical head is spaced from the disk during operation by less than one wavelength (e.g., a small fraction of one wavelength), static charge on the disk surface can accumulate to a static voltage on the order of several kilo volts.

SUMMARY

Methods and disk designs to reduce accumulation of electrostatic charge in a disk are provided to dissipate electrostatic charge out of the disk. An electrically-conducting path is implemented to transfer the electrostatic charge to a reference ground.

A data storage device of one embodiment includes a substrate having at least a substrate surface, a coupling unit (e.g., a disk hub) engaged to the substrate, a conducting layer formed on the substrate and the coupling unit, a storage layer formed on the conducting layer, and at least one dielectric layer formed over the storage layer. The coupling unit has a bottom surface and a top surface. The bottom surface is in contact with the substrate surface so that the top surface is elevated from the substrate surface. The conducting layer covers a portion of the substrate surface and a portion of the top surface of the coupling unit to form an electrically conducting path from the substrate to the top surface of the coupling unit. The storage layer and the dielectric layer are formed over at least a portion of the substrate.

Another embodiment of the data storage device has a disk which includes a substrate and a disk hub formed on a center of one surface of the substrate, and a spindle motor having a conducting spindle engaged to the disk hub to hold and rotate the disk. The disk includes a contiguous conducting layer disposed in part on the surface of the substrate and in part on the disk hub to form an electrically-conducting path from the substrate to the disk hub, a storage layer formed on the conducting layer, and at least one dielectric layer formed over the storage layer. The conducting spindle is in contact with said conducting layer to receive static charge accumulated on the disk.

A disk may include conducting layers on both sides of the disk substrate. The two conducting layers may be electrically coupled to each other so both can be grounded through a contact with the conducting spindle. One way to achieve this is to deposit the metal layers without an outer diameter mask so that the metal layer contiguously wraps around the outer edge to cover both sides of the substrate.

These and other aspects and associated advantages will become more apparent in light of the detailed description, the accompanying drawings, and the appended claims.

BRIEF DESCRIPTION OF THE DRAWINGS

FIGS. 2A, 2B, 2C, 3A, 3B, and 4 show exemplary embodiments of an optical disk that implements a conducting path for removing static charge.

DETAILED DESCRIPTION

The present disclosure is in part based on the discovery and recognition that electrostatic charge on a disk surface can cause adverse effects in many disk drives, specially in near-field optical drives. For example, static charge can cause electrostatic particulate attraction. Hence, contamination particles can accumulate on the statically-charged disk surfaces and can distort optical signals that pass therethrough such as the tracking error signal, read only signal, or magneto-optical signal depending on the configuration of the drive. Accumulation of static charge can also lead to detrimental discharge that may cause system malfunction or damage the optical head and even the disk drive.

It is also recognized that particles adhered to the disk surface by electrostatic particulate attraction may transfer to the optical head. Due to localized heating by absorption of a focused optical beam, the particles on the optical head can become permanently bonded and cause signal distortions. Such signal distortions can cause loss of tracking, track misregistration, data jitter, reduction in the signal-to-noise ratio, or other problems that degrade the performance or even cause malfunction of the disk drive. Therefore, it is desirable to reduce electrostatic charge on the disk surfaces so as to improve the performance and reliability of a disk drive.

Electrostatic charge on the disk may also cause other adverse effects. For example, an attractive or repulsive force generated by the electrostatic charge may undesirably change the distance between the optical head and the disk, especially when in the near-field optical configuration.

A further discovery of the present disclosure is that an electrically-conducting path can be implemented in a special way to transfer the electrostatic charge to a reference ground. The following description provides methods and disk designs to reduce accumulation of electrostatic charge in a disk drive by dissipating the electrostatic charge out of at least one disk surface.

Figure 1:
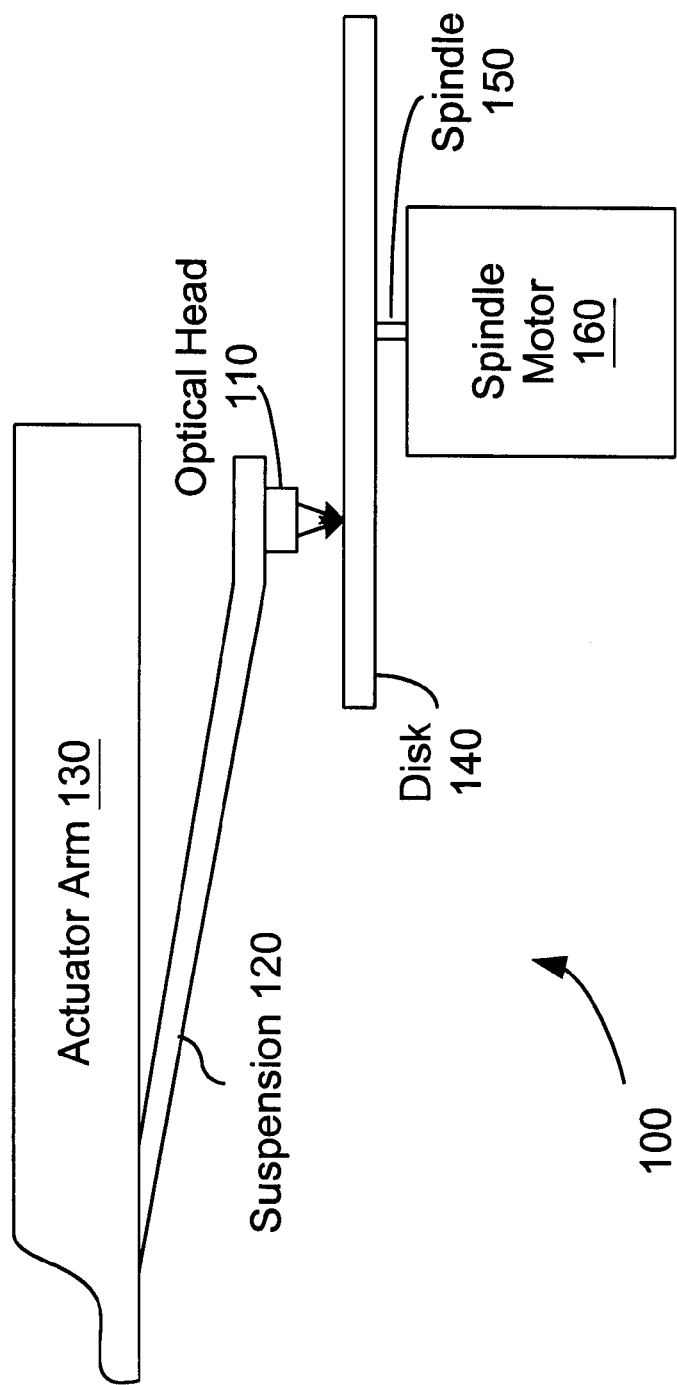
FIG. 1 is a block diagram of one embodiment of an optical disk drive having a flying optical head.

FIG. 1 shows a portion of an optical disk drive 100 according to one embodiment. The disk drive 100 includes an optical head 110 to couple optical energy to and from an optical disk 140 for retrieving data or recording data. The optical disk 140 includes one or more storage layers which may be formed of a magneto-optical material, a phase-change material, or other materials suitable for data storage. The optical head 110 is engaged to a suspension arm 120 which is further attached to an actuator arm 130. The optical head 110 has an air-bearing surface and floats over the spinning disk 140 by action of the air bearing. The actuator arm 130 is movable to place the optical head 110 at a desired position over the disk 140. The disk 140 is held by a spindle 150. A spindle motor 160 drives the spindle 150 to rotate the disk 140. The disk 140 may be enclosed in a disk cartridge. Two or more optical heads or disks may be implemented to increase the storage capacity of the drive 100.

The disk drive 100 may be configured and operated in two optical configurations. In a far-field configuration, the optical head 110 is spaced from the surface of optical disk 140 by a distance greater than one wavelength of the illumination radiation during operation. Optical energy is coupled between the head 110 and the disk 140 by light propagation and the focused spot size on the disk is limited by optical diffraction. The disk drive 100 may also place the optical head 110 from the surface of the disk 140 by a distance less than one wavelength in a near-field configuration. In this configuration, the optical head 110 can be constructed in a way to couple at least a portion of the optical energy to the disk 140 by evanescent waves. This portion of the optical energy is not limited by diffraction and allows an effective numerical aperture of the optical head 110 to be grater than unity. One embodiment of the optical head 110 includes a solid immersion lens having a spherical surface and an opposing flat surface. See, U.S. patent application Ser. No. 08/846,916.

The optical disk 140 is constructed to provide a special electrically-conducting path to the spindle motor 160 through the spindle 150. The spindle motor 160 may be electrically coupled to the base of the disk drive 100 or electrically grounded. This electrically-conducting path operates to dissipate accumulated static charge on the optical disk 140 and hence to substantially reduce occurrence of adverse effects associated with such charge.

The optical disk 140 may be formed from a substrate which can be a non-conducting material such as glass or a plastic material (polycarbonate, amorphous poly olefin, etc.). A reflective layer of a conducting material is then formed on the substrate and may include one or multiple conducting films. The conducting material may comprise one or more metals, including but not limited to, aluminum, gold, silver, copper, titanium or chromium. Noble metals such as gold and corrosion-resistant materials such as titanium, chromium may be preferred. Over the reflective layer are sequentially formed with a storage layer and one or more dielectric overlayers. The storage layer may include a magneto-optical material or a phase-change material for data storage. The electrically-conducting path is preferably formed by an electrical contact between the conducting reflective layer and the spindle motor 160. This electrical contact may be implemented in a number of configurations.

FIG. 2A shows one embodiment 201 of the optical disk 140 with a conducting path. A substrate 210 has a center aperture 212 and a central region around the aperture 212 for placing a disk hub 250. The disk hub 250 is in effect a special form of a coupling unit which engages the disk 140 to the spindle 150. The disk hub 250 has a bottom flat surface bonded to the substrate 210, slanted side walls, and a flat top surface. A center through hole 252 is formed in the disk hub 250 to engage the disk 201 to the spindle 150 against its top surface. The disk hub 250 may be made of any suitable materials but is often made of a non-conducting material such as plastic. A metal insert 260 may be embedded in the disk hub 250 and is exposed on the top of the hub 250 and on the side walls of the hole 252.

Figure 2C:
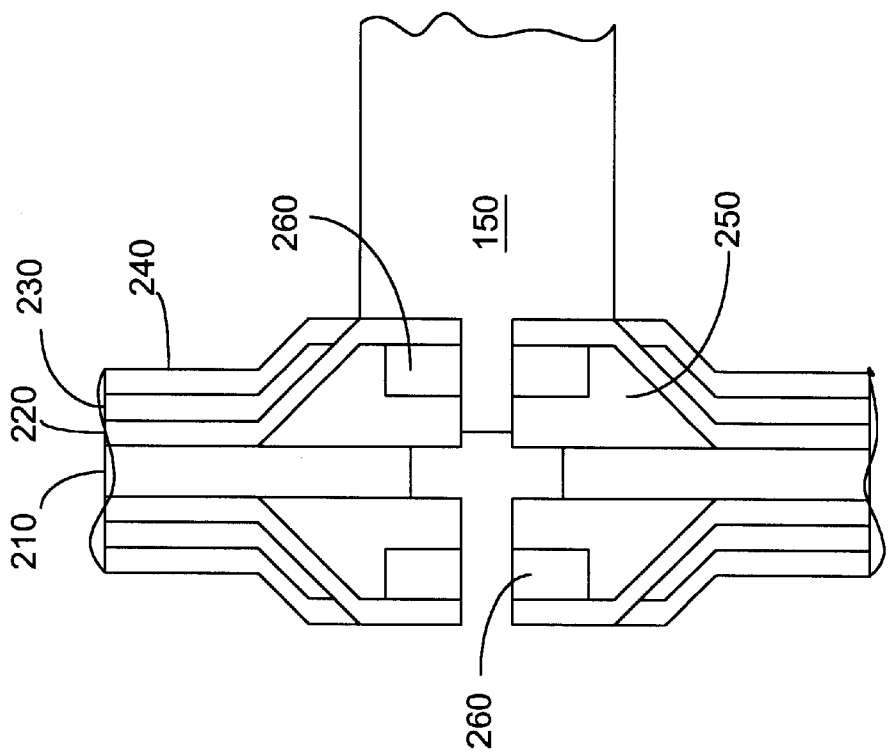

A metallic reflective layer 220 may be contiguously formed over the substrate 210 and extends to cover the top surface of the disk hub 260 so that it is in electrical contact with the metal insert 260. The metallic layer 220 may completely cover the surface of the disk hub 260 as shown in FIG. 2A or may only cover a sufficient portion of the top surface of the disk hub 260 to be in contact with the metal insert 260 as shown by an embodiment 202 in FIG. 2B. A storage layer 230 and at least one dielectric overlayer 240 are formed over the metallic layer 220 to either completely expose the disk hub 260 or to cover only the slanted side walls with the top surface exposed (FIG. 2C).

This embodiment of the disk 140 uses the metallic layer 220 to form a portion of the conducting path. When the disk 140 is engaged to the spindle 150, the spindle 150 is in contact with both the portion of the metallic layer 220 on the top of the disk hub 250 and the metal insert which is also in contact with the metallic layer 220. The spindle 150 is engaged to the spindle motor 160 and is either electrically grounded or coupled to the base of the disk drive 100. Therefore, the conducting path is formed from the disk 140, through the extended portion of the metallic layer 220, the spindle 150, and the spindle motor 160, to the electrical ground or the base of the disk drive 100. The conducting path removes static charge from the disk 140 and transfers the charge to ground. In this way, undesired or detrimental effects associated with static charge can be avoided.

In the disk designs shown in FIGS. 2A–2C, the metallic layer on one side of the disk 140 is electrically coupled to a reference ground. When static charge accumulated on a disk surface is substantially uniform, it may be sufficient to ground one surface of the disk 140. This dissipates the charge to ground while leaving the metallic layer on another side ungrounded and floating.

An alternate embodiment grounds both sides of the disk 140 in order to ensure efficient conduction of the static charge to ground.

Figure 3A:
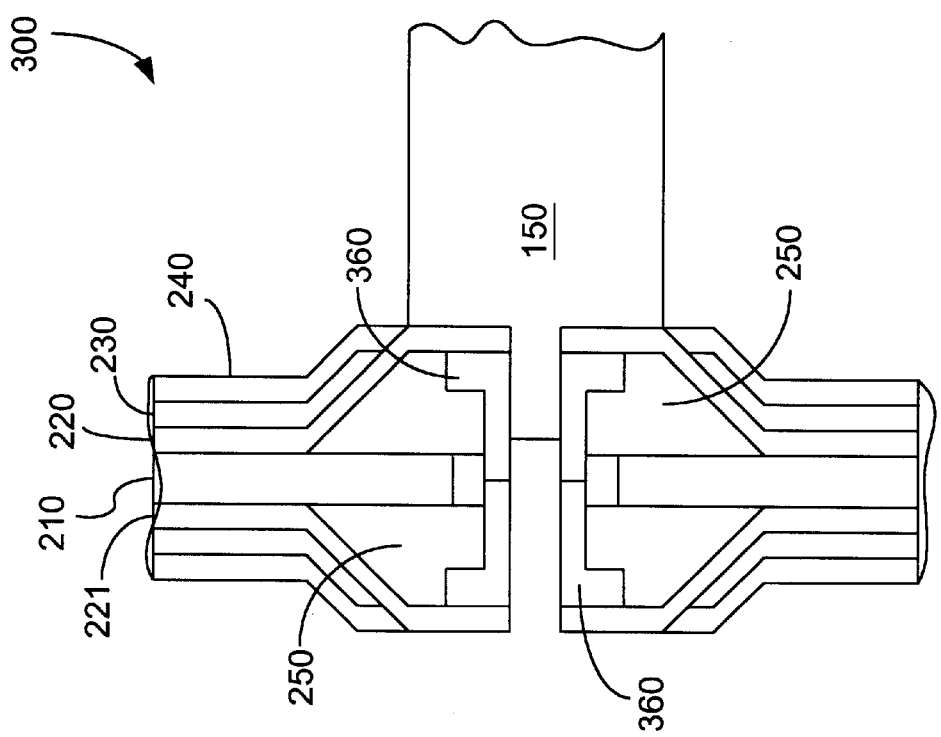

FIG. 3A shows one technique with an alternate embodiment 300 of the disk 140. Metal inserts 360 on two sides of the disk 300 are in contact with each other to form a conducting path for transferring electrostatic charge. This contact connects the metallic layer 220 on one side of the substrate 210 to the second metallic layer 210 on the opposite side of the substrate 210. When the disk 300 is engaged to the grounded spindle 150, both metallic layers 220 and 221 are electrically grounded to dissipate electrostatic charge. Another embodiment involves placing a metal piece in the substrate 210 to connect the metallic layers on the opposite sides of the disk. This metal piece may be formed in a through hole in the substrate 210.

Figure 3B:
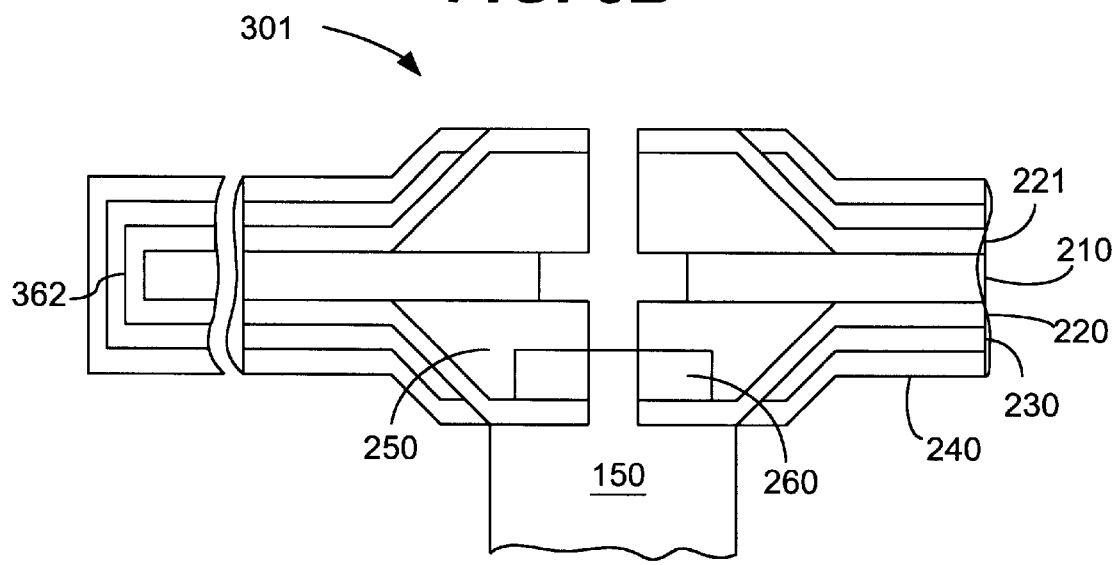

FIG. 3B shows yet another alternate embodiment 301 of the disk 140 for dissipating electrostatic charge. Two metallic layers 220 and 221 on opposite sides of the substrate 210 can be electrically connected to each other at the outer edge of the substrate 210. A metallic bridge section 362 is used to form a conducting path between the metallic layers 220 and 221. Hence, both sides can be grounded through a contact with the conducting spindle 150 from either side. The metallic layers 220 and 221 may be deposited over the substrate 210 prior to deposition of the recording and dielectric layers without using an outer diameter mask. In this way, a metal layer contiguously wraps around the outer edge to cover both sides of the substrate 210.

Figure 4:
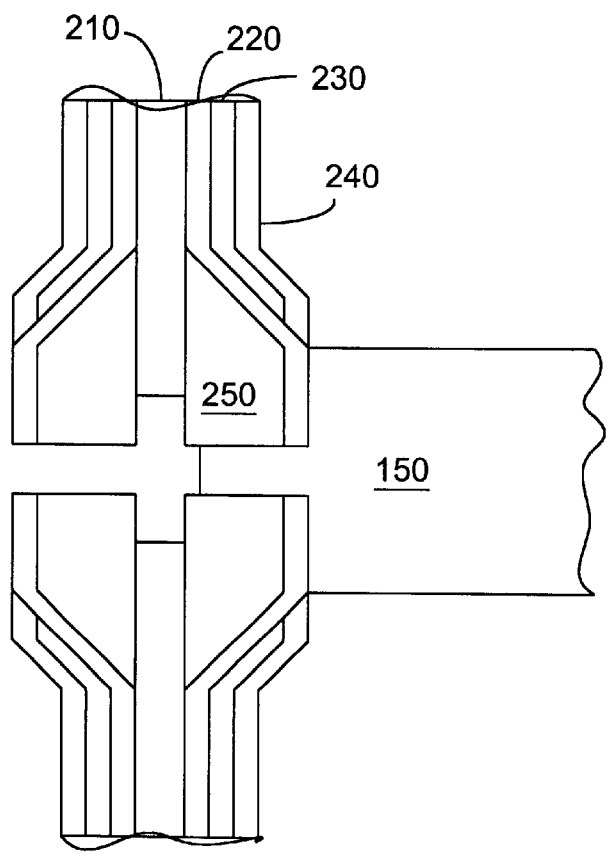

FIG. 4 shows yet another embodiment of the disk 140 which does not use the metal insert 260. The metallic layer 220 covers at least a portion of the top surface of the disk hub 250 so that the spindle 260 can contact the metallic layer 220 to form the conducting path when the disk 140 is loaded. The disk hub 250 may be made of either a non-conducting plastic material or a conducting plastic material. The conducting plastic material may be used to improve the conduction between the metallic layers and the spindle and hence enhance charge dissipation. The conducting plastic material may be formed by doping or impregnating conductive metal particles in plastic. A metal conducting bridge, like the bridge 362 in FIG. 3B, can also be formed in the disk of FIG. 4 to ground both sides of the disk.

Although only a few embodiments are described, various modifications and enhancements may be made. For example, the conducting path may be implemented in a medium format other than disks. The reflective metallic layer may be electrically coupled to the spindle through other conducting elements rather than direct contact or through the metal insert. In addition, the reflective metallic layer may be electrically coupled to ground through other conducting channels instead of the spindle. These and other variations are intended to be fully encompassed by the following claims.

What is claimed is:

1. A data storage device, comprising:
    a substrate having at least a substrate surface;
    a coupling unit having a bottom surface and a top surface and engaged to said substrate with said bottom surface in contact with said substrate surface so that said top surface is elevated from said substrate surface;
    a conducting layer formed on said substrate and said coupling unit to cover a portion of said substrate surface and a portion of said top surface to form an electrically conducting path from said portion of said substrate to said portion of said top surface, said conducting path operable to dissipate electrostatic charge;
    a storage layer formed on said conducting layer over at least a portion of said substrate to store data; and
    at least one dielectric layer formed over said storage layer.

2. A device as in claim 1, wherein said storage layer includes a magneto-optic material.

3. A device as in claim 1, wherein said storage layer includes a phase-change material.

4. A device as in claim 1, further comprising a conducting medium holder, sized to be attachable to said coupling unit in such a way that said conducting medium holder is in contact with said top surface and said conducting layer when attached to said coupling unit.

5. A device as in claim 1, wherein said conducting layer includes at least one member which is formed of aluminum, gold, silver, copper, titanium, or chromium.

6. A device as in claim 1, wherein said coupling unit is formed of an electrically conducting material.

7. A data storage device, comprising:
    a storage medium which includes:
        a substrate having at least a substrate surface,
        a coupling unit having a bottom surface and a top surface and engaged to said substrate with said bottom surface in contact with said substrate surface so that said top surface is elevated from said substrate surface,
        a conducting layer formed on said substrate and said coupling unit to cover a portion of said substrate surface and a portion of said top surface to form an electrically conducting path from said portion of said substrate to said portion of said top surface, said conducting path operable to dissipate electrostatic charge,
        a storage layer formed on said conducting layer over at least a portion of said substrate to store data, and
        at least one dielectric layer formed over said storage layer; and
    an optical head disposed to couple optical radiation to and from said storage medium.

8. A device as in claim 7, wherein said optical head is structured to produce an effective numerical aperture greater than unity.

9. A device as in claim 7, wherein said optical head has an air-bearing surface and floats over said storage medium during operation.

10. A device as in claim 7, wherein said optical head is spaced from said storage medium by less than one wavelength of said optical radiation during operation.

* * * * *